United States Patent
Ploechinger

(10) Patent No.: US 7,497,118 B2
(45) Date of Patent: Mar. 3, 2009

(54) SENSORS FOR DETECTING POSITION, INCLINATION TO PERPENDICULAR, MOVEMENT AND ACCELERATION BASED ON THERMODYNAMIC EFFECTS AND METHOD FOR OPERATING AND FOR MANUFACTURING SAID SENSORS

(75) Inventor: Heinz Ploechinger, Hinding 68, Freinberg (AT) A 4785

(73) Assignee: Heinz Ploechinger, Freinberg (AT)

( * ) Notice: Subject to any disclaimer, the term of this patent is extended or adjusted under 35 U.S.C. 154(b) by 490 days.

(21) Appl. No.: 11/161,322

(22) Filed: Jul. 29, 2005

(65) Prior Publication Data

US 2006/0037395 A1    Feb. 23, 2006

(30) Foreign Application Priority Data

Aug. 18, 2004    (DE)   ........................ 10 2004 040 003

(51) Int. Cl.
*G01P 15/00*    (2006.01)

(52) U.S. Cl. ................... 73/514.09; 73/488; 73/514.05; 340/669; 340/671; 33/366.15

(58) Field of Classification Search .................. 73/488, 73/514.09, 514.05; 340/686.1, 669, 671; 33/365, 366.11, 366.12, 366.15
See application file for complete search history.

(56) References Cited

U.S. PATENT DOCUMENTS

| 6,722,199 | B2 | 4/2004 | Ploechinger |
| 2002/0189349 | A1 * | 12/2002 | Ploechinger ................. 73/488 |
| 2003/0074953 | A1 * | 4/2003 | Glaser et al. ................. 73/32 A |

FOREIGN PATENT DOCUMENTS

| DE | 40 34 962 C1 | 6/1992 |
| DE | 42 43 978 C1 | 1/1994 |
| DE | 196 19 686 C2 | 10/1997 |
| DE | 103 48 245 A1 | 12/2004 |
| EP | 11 11 395 A1 | 6/2001 |

OTHER PUBLICATIONS

J. Pekola et. al., "Cryogenics on a Chip". Physics Today, May 2004, pp. 41-47.

* cited by examiner

*Primary Examiner*—Hezron Williams
*Assistant Examiner*—Samir M Shah

(57) ABSTRACT

The invention relates to construction principles, operating and manufacturing methods for inertial sensors, i.e., sensors for rapidly detecting movement and acceleration in all degrees of freedom in space, and for separately detecting the position with respect to the perpendicular under the action of acceleration due to gravity.

Use is made of the knowledge that to maintain a common convection zone of two or more sensor elements, the power fractions supplied to these elements vary with change in position, movement and acceleration.

20 Claims, 16 Drawing Sheets

Fig. 1
Fig. 1a
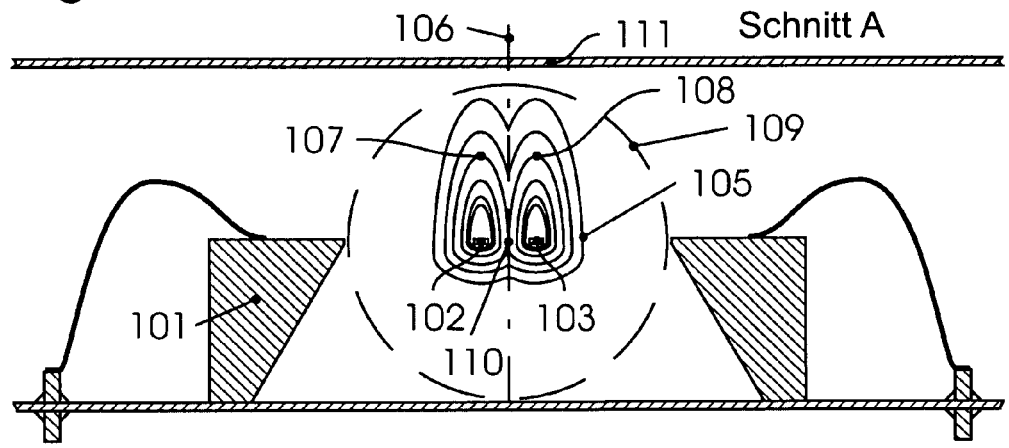
Schnitt A
Fig. 1b
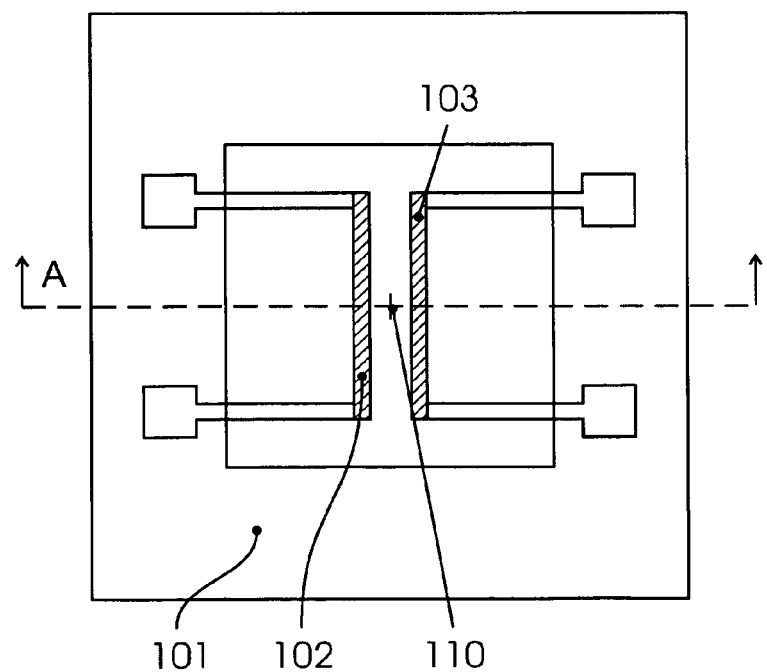

Fig. 1
Fig. 1c
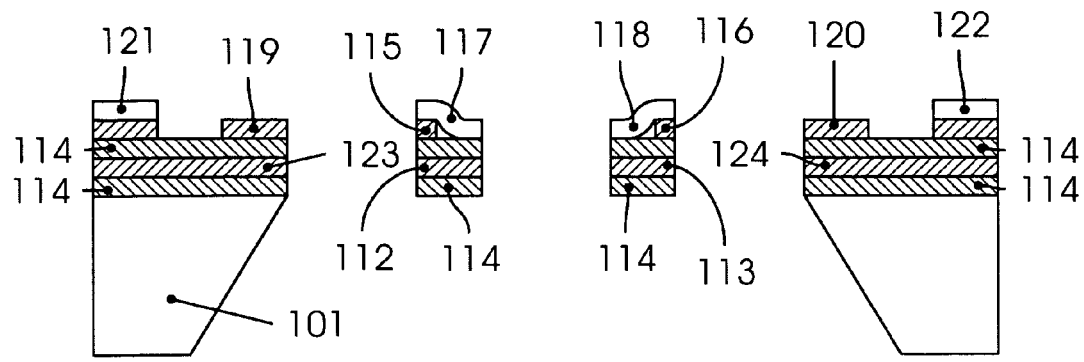
Fig. 1d
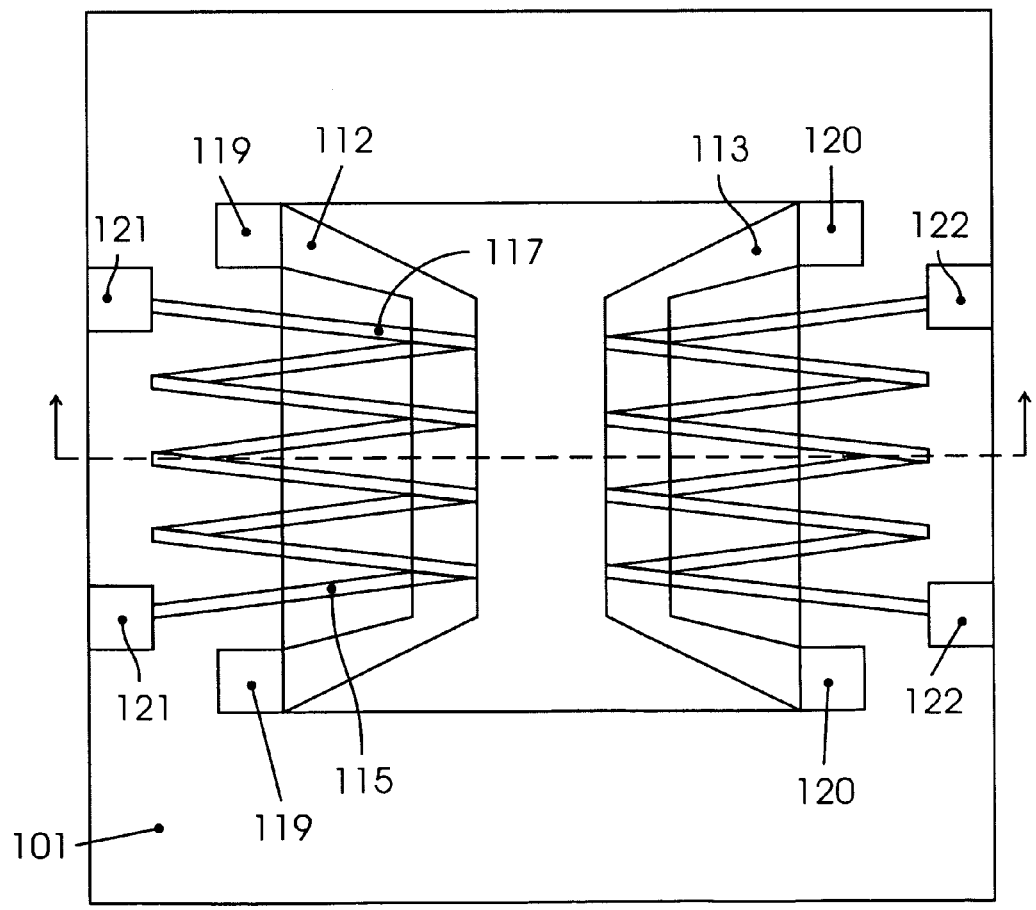

Fig. 4
Fig. 4a
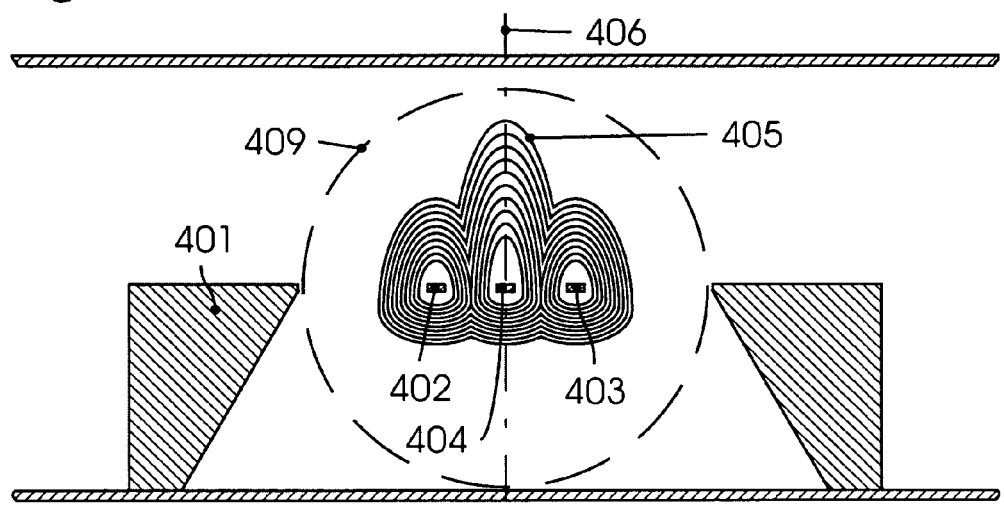
Fig. 4b
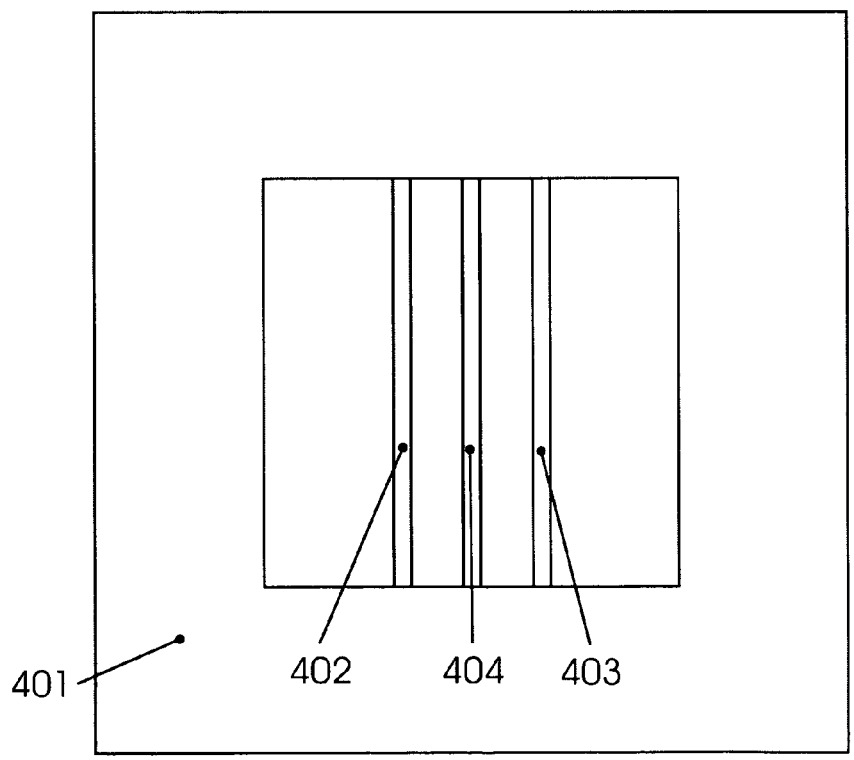

Fig. 5
Fig. 5a
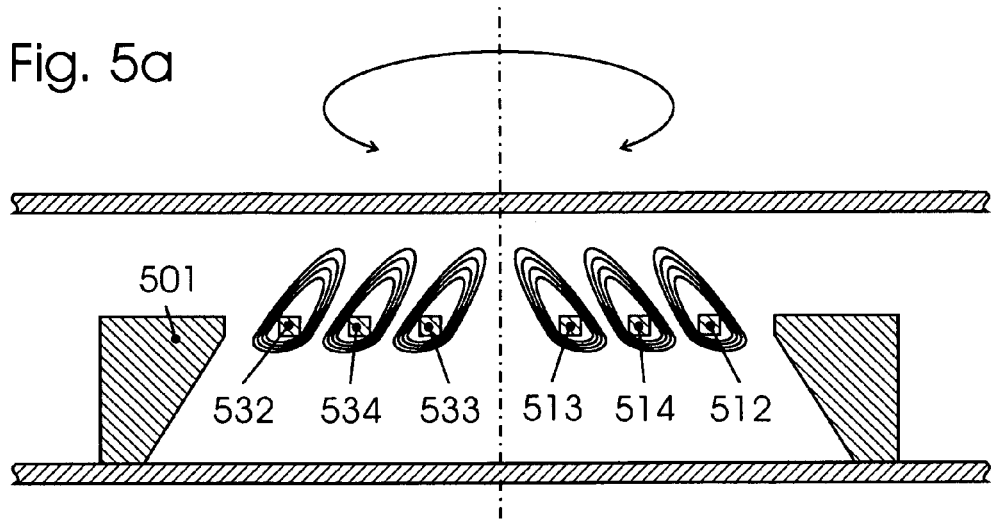
Fig. 5b
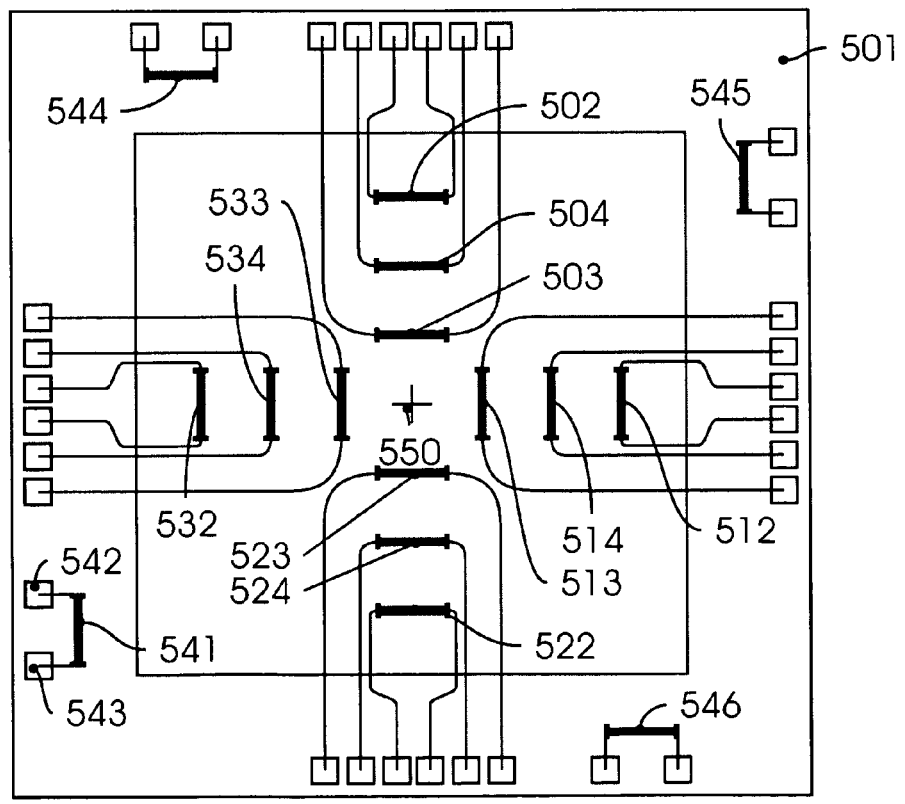

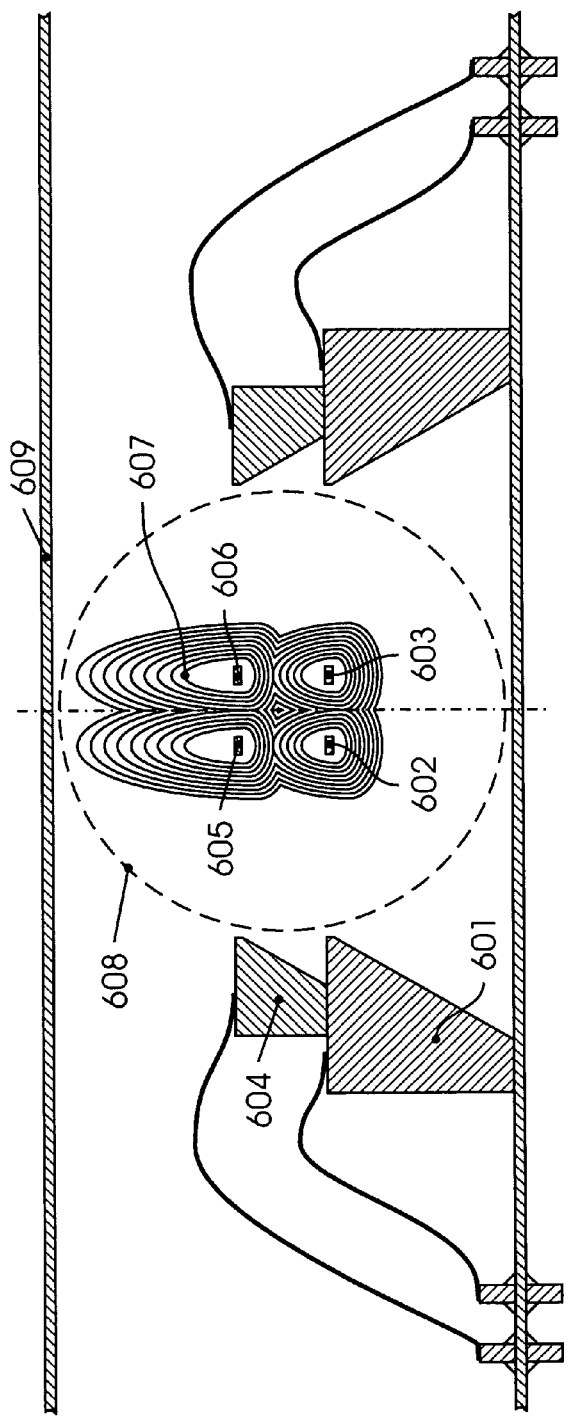

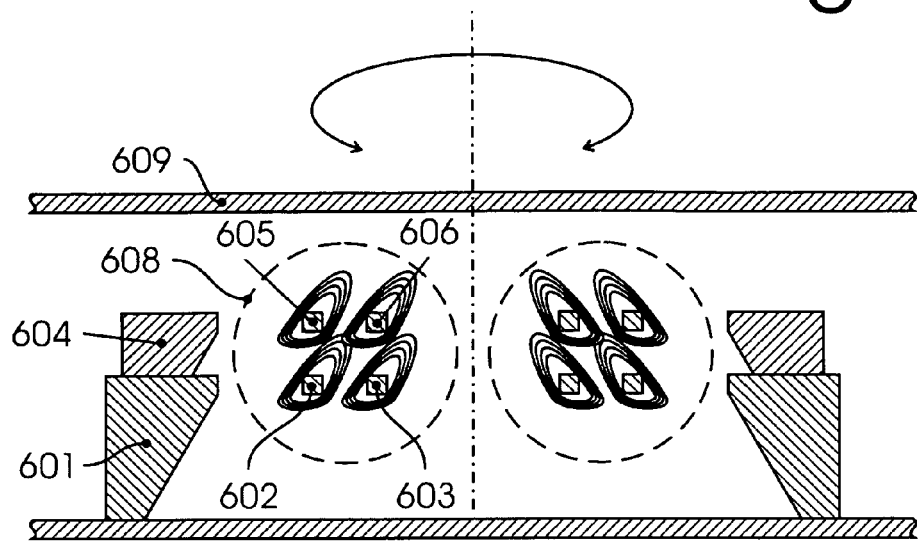
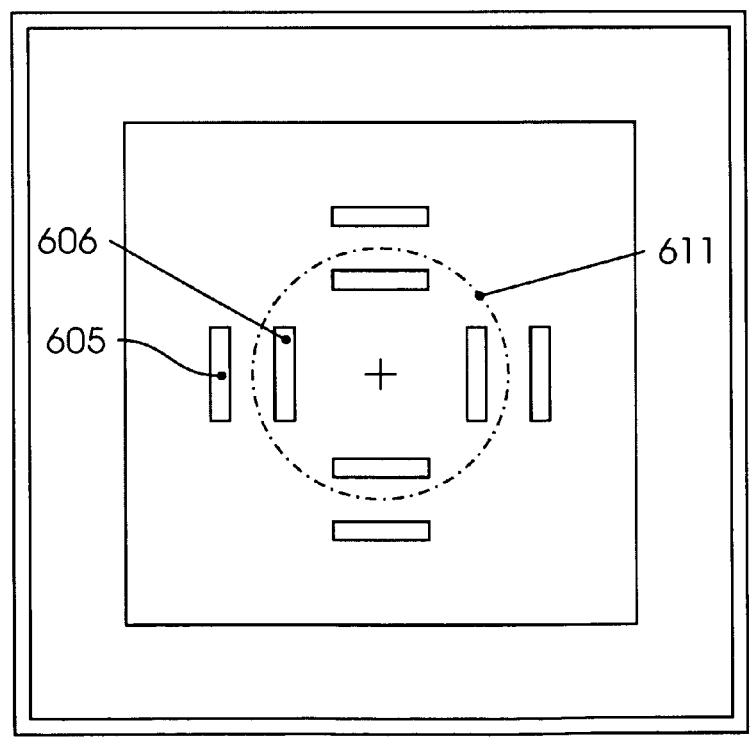
Fig. 6b

Fig. 7
Fig. 7a
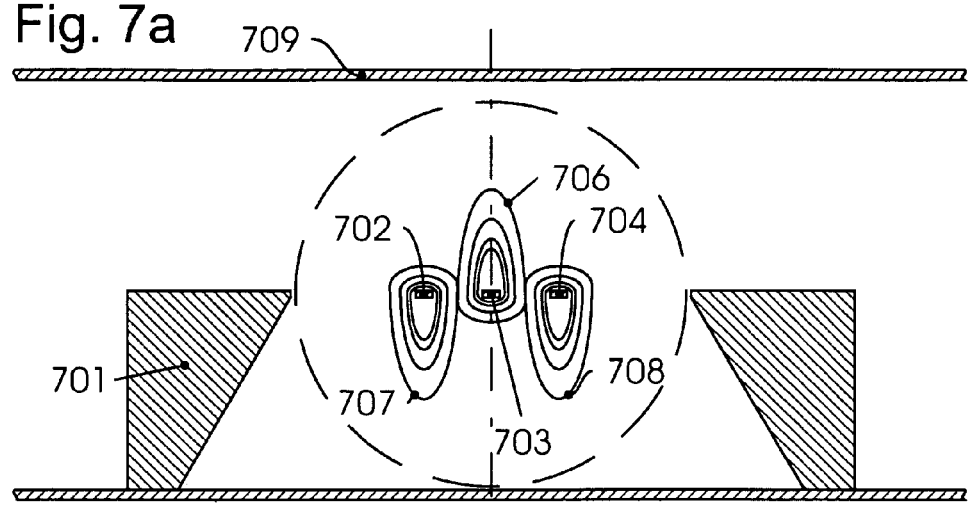
Fig. 7b
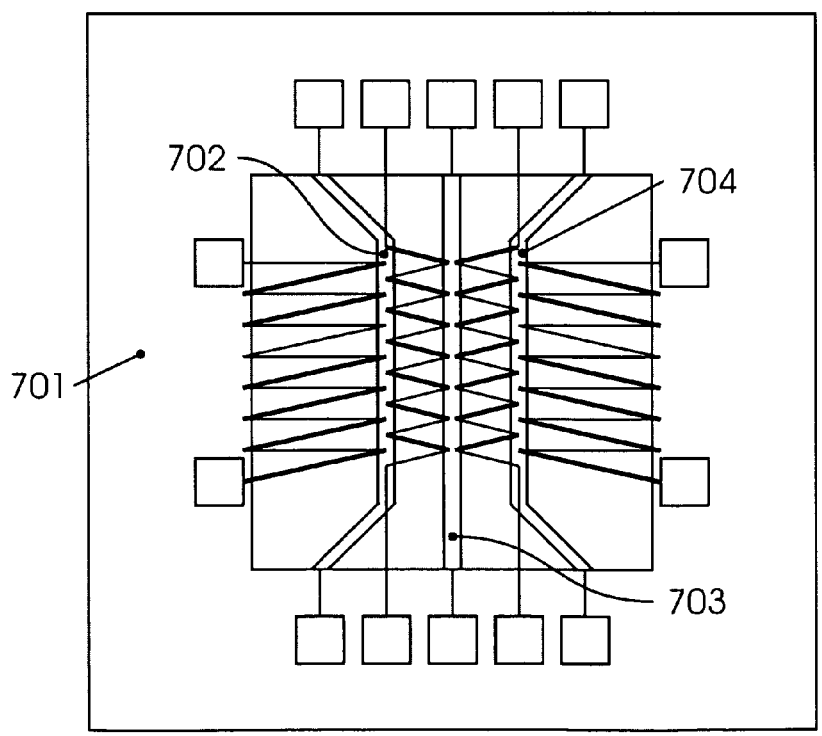

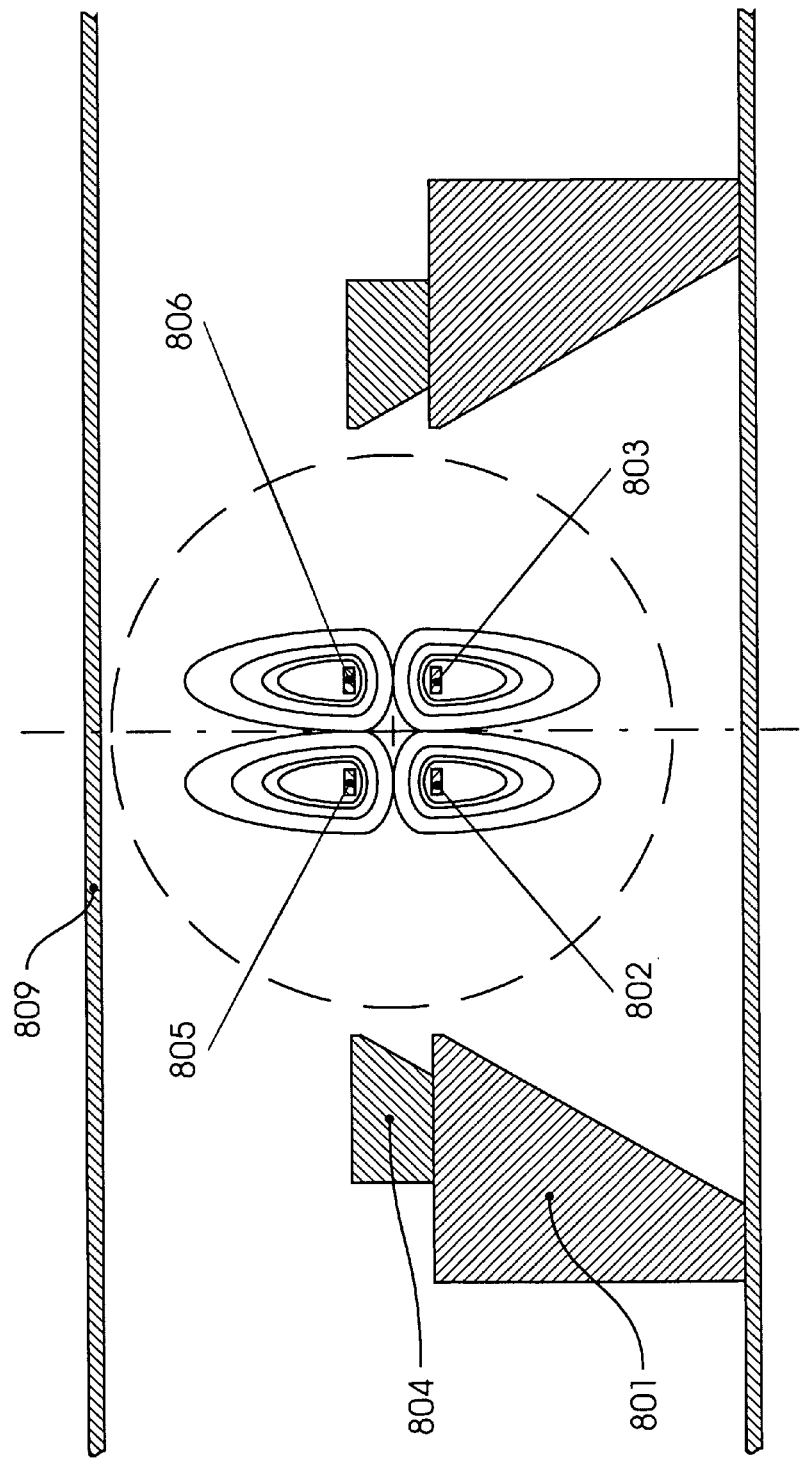

Fig. 10
Fig. 10a
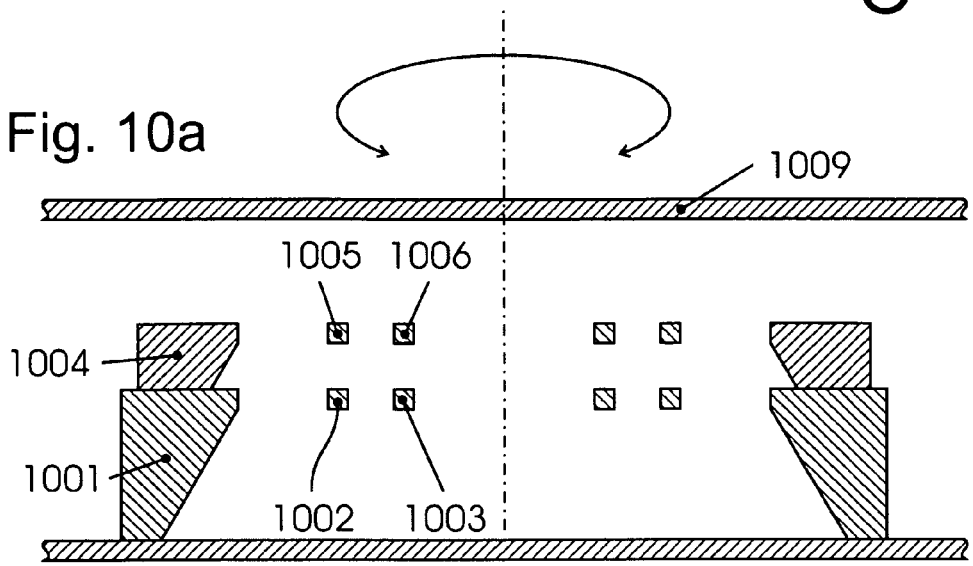
Fig. 10b
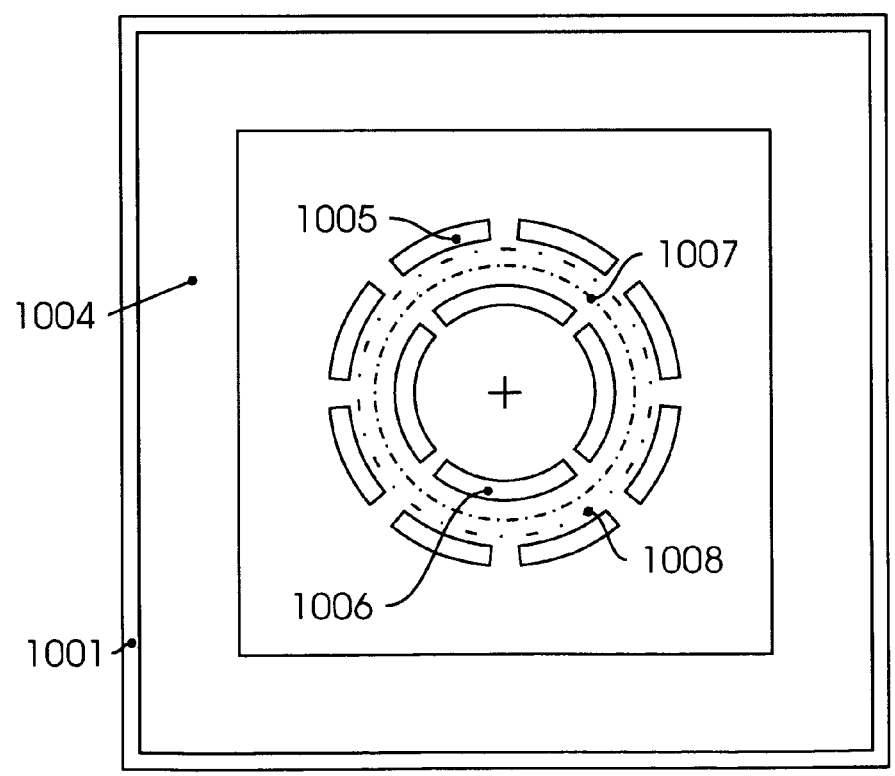

SENSORS FOR DETECTING POSITION, INCLINATION TO PERPENDICULAR, MOVEMENT AND ACCELERATION BASED ON THERMODYNAMIC EFFECTS AND METHOD FOR OPERATING AND FOR MANUFACTURING SAID SENSORS

TECHNICAL FIELD

The present invention generally relates to a sensor, and more particularly, to a sensor for measuring position, inclination, motion and acceleration based on thermodynamic effects.

BACKGROUND OF THE INVENTION

Thermodynamic sensors for detecting inclination and acceleration are known from DE 42 43 978 C1. Temperature-dependent electrical resistances of which at least one is heated are arranged in a closed fluid-filled capsule. The convective flow established in a gravitational or inertial field is evaluated.

EP 1 111 395 A1 and U.S. Pat. No. 6,722,199 B2 describe sensors for detecting rate of rotation, rotational acceleration and inclination based on the principle from DE 4243978 C1. Also known are other thermodynamic sensors wherein the temperature differences in the convective flow field are detected, for example, by thermoelements (thermopiles).

In these known sensors it is initially assumed that the measuring elements must adapt to the respective temperature of the isotherms in the convection field during an inclination or acceleration. Even if the mass of the measuring elements is small, this thermal adaptation takes a certain time. Thus, the response time of the sensors is frequently too high and the limiting frequency relatively low. In known sensors the signals for the inclination and acceleration cannot be directly discriminated.

Sensors based on density differences in fluids and methods for operating and for manufacturing said sensors are known from DE 103 48 245.8-52 of the applicant. Unlike previously described operating methods using sensor elements which adjust to a new temperature in a stationary isothermal field during a movement or change in position, in this case cyclic density fluctuations are generated by a transmitting element, received by a receiver and substantially time shifts (e.g., of the temperature variations) which are seen during movement or change in position are detected.

In claim 6 of the patent specification DE 42 43 978 C1 reference is already made to the possibility of regulating at least one of the temperature-dependent elements at constant temperature. No specific instruction as to how this operating variant can be advantageously used is found either in this patent specification nor in other relevant documents.

It is the object of this invention to describe the structure, operating mode and method of manufacture of fluid-filled thermodynamic sensors for detecting movement, acceleration and measured quantities attributable to acceleration where lateral and vertical acceleration, rate of rotation and rotational acceleration can be assigned and, under the action of acceleration due to gravity, a separate identification of position with respect to the perpendicular can be made. It is further the object of the invention to provide conditions for fast response, high limiting frequency, self-testing capability, independent after-calibration, monitoring of fluid density, best possible accuracy and long-term stability of said sensors.

The proposed sensors should be suitable for individual quantities or for a selection of or for all said quantities (inertial sensor) and preferably should be manufacturable using Microsystems technology.

When designing the sensors, broadly all acting forces and effects (inertia, Earth's attraction, centrifugal acceleration, Coriolis effect etc.) should be taken into account.

The operating modes should be described including specific circuits.

SUMMARY OF THE INVENTION

The invention is based on the following findings:

The power matching of an excitation-measuring element ("sensor element") by an electronic control circuit to maintain a constant temperature of the element when the heat flux is varied can be accomplished considerably faster than the temperature matching in arrangements with variable temperatures. Isothermal fields of two or more elements regulated at constant temperature according to finding "1" are superimposed such that the power supply to the individual elements in the rest state of the arrangement and without any acting acceleration is distributed constantly and uniformly to the individual elements whereas under movement or acting acceleration, different power distributions or changes in the total power supply are obtained.

According to the invention, two or more adjacent isothermal fields of two or more heating or cooling elements are built up statically or cyclically. These exciting elements are either used as temperature measuring elements themselves or have temperature measuring elements associated with them. In a short-form those combinations of excitation and measuring elements are named "sensor-element." For heating purposes doped semiconductor materials, applied resistance layers etc. and for cooling, cooling elements manufactured using Microsystems technology can be used as exciting elements, constructed, for example, according to the Peltier effect or Thomson principle or others (see also in this context the article "Cryogenics on a Chip" in "Physics Today", May 2004, p. 41-47).

The sensor elements are regulated electronically at an absolute constant temperature or at a constant temperature difference from the ambient temperature level or at a constant temperature difference from a constantly maintained reference temperature level. In the isothermal field the regulated temperature also constitutes the highest level (heating element) or the lowest level (cooling element). The individual sensor element control loops preferably have a common desired value according to the highest or lowest value to be regulated but they are supplied separately with power.

In plurality of sensor element control loops, it can also be appropriate to select different desired values. In addition, it can be advantageous to modulate the preselected highest or lowest level of the isothermal fields with periodic fluctuations.

The isothermal fields, generated for example by two or more neighboring elements having the same desired value, are superposed in the inner region between the sensor elements and form joint isotherms in the outer region. When viewed from outside, a joint isothermal field can thus be assumed.

The individual sensor elements each have the same fraction of the total power to maintain the joint isothermal field in the rest position and at the same desired value, that is 50% each in the case of two elements.

When the arrangement is accelerated, the individual elements initially enter into the range of different isotherms.

However, the rapid electronic control loop of each individual element immediately brings about a power readjustment in the event of the smallest tendency to temperature variation by means of a high control loop amplification in order to maintain the desired temperature.

In the particular case of acceleration due to gravity acting from the beginning, a uniform power distribution (in the case of two elements, 50% each) is only given if the plane in which the elements are located is horizontally aligned.

The power distribution changes if the plane of the elements has a different angle to the perpendicular (differing from 90°). The total power, as already presented in claim 7 in DE 42 432 978 C1, is initially a measure for the ambient temperature if the regulated temperature level has a certain absolute temperature as the desired value. If the temperature is regulated to a certain difference from the ambient temperature or to a constantly maintained reference temperature, however the total power is largely independent of the ambient temperature level.

In both cases, however the total power consumption in the arrangement according to the invention varies when the arrangement is accelerated.

Since both or a plurality of sensor elements are regulated to a standard or fixed temperature level and have a common isothermal field, the multiple arrangement can be considered as a unit for simplicity. This behaves as the heated filament from DE 40 43 962 C1, claim 8 (see prior art in DE 4243 978 C1). The total power requirement derived from the total of the power values for the individual elements changes with any acceleration of the arrangement.

For example, if the arrangement moves laterally in the direction of the plane where the elements are located, the outer elements dip into isotherms having a different temperature, which results in a corresponding readjustment of the individual elements and thus in a variation in the total power. The variation of the total power requirement is a measure for the acceleration acting on the arrangement.

A static inclination of the arrangement results, as described above, in a change in the power distribution but not in a change in the total power or only to a small extent.

It is thus possible to discriminate between inclination and acceleration.

A vertical acceleration of the arrangement likewise results in a change in the total power requirement.

It is thus already sufficient to have an arrangement of two neighboring sensor elements in one plane which are regulated separately at constant temperature in order to obtain information on the direction and extent of the inclination in one axis and/or on the extent of the lateral acceleration in this axis and on the extent of the vertical acceleration of this arrangement from the two power or voltage signals by forming the sum or taking the difference.

The arrangement of a second pair of sensor elements at right angles in the same plane to the first pair makes it possible to detect biaxial inclination and acceleration.

In order to determine the direction of the lateral acceleration, according to the invention at least one further sensor element is arranged in the center between two elements in the same plane and is regulated at a higher temperature than the two elements for example. In this way, in the event of a lateral acceleration in this plane the total power requirement for all three elements changes but also the distribution of the power of the two outer elements since one moves towards higher temperature and the other moves away therefrom. Thus, if the total power requirement and the distribution change in this arrangement, a lateral acceleration exists whose direction can be deduced from the distribution and its extent can be deduced from the change in total power.

If the direction of a vertical acceleration is to be determined uniquely, it is recommended to use a further vertically distant plane with sensor elements.

A sensor for measuring inclination over 360 angular degrees with uniform accuracy over the entire range can be constructed, for example, using four elements arranged equidistantly in space. An arrangement of eight elements in two planes (for example, four at the lower edges and four at the upper edges of an imaginary cube) is used to measure movement and acceleration in all degrees of freedom and thus forms an inertial sensor.

The operating mode according to the invention makes the slow thermal adaptation process superfluous, which results in faster response of the sensors. By maintaining a constant temperature of the elements, crosstalk to other measurement axes is minimized. In addition, mechanical aftereffects of the temperature variation, such as bending or bimetal effects in identical element structures, for example, are largely ineffective in the sense of the measurement. This improves accuracy and long-term stability. Sensors according to the invention supply separate signals for movement or acceleration in all degrees of freedom and for the position in space.

As a very important feature acceleration can be discriminated from static tilt.

BRIEF DESCRIPTION OF THE DRAWINGS

FIG. 1*a* is a cross section of a sealed sensor according to the invention.

FIG. 1*b* is a plan view of the supporting member shown in FIG. 1*a*.

FIG. 1*c* is a cross section of an alternative embodiment, illustrating a structural variant of a sensor with thermopiles.

FIG. 1*d* is a plan view of the sensor shown in FIG. 1*c*.

FIG. 4*a* is a cross section of an alternative embodiment of the sensor as in FIG. 1*a*.

FIG. 4*b* is a plan view of the sensor in FIG. 4*a*.

FIG. 5*a* is a cross section through an exemplary arrangement of several sensors according to the invention.

FIG. 5*b* is a plan view of the sensor arrangement in FIG. 5*a*.

FIG. 6*a* shows a sensor arrangement according to the invention comprising sensor elements on two levels.

FIG. 6*b* shows an alternative embodiment of the sensor arrangement in FIG. 6*a*.

FIG. 7*a* shows a sensor structure according to the invention using heating and cooling elements.

FIG. 7*b* shows a plan view of an arrangement such as can be fabricated, for example, to fulfill the function described under FIG. 7*a*.

FIG. 8 shows a sensor arrangement according to the invention comprising heating and cooling elements in two planes.

FIG. 10a shows a sensor arrangement according to the invention with elements in two planes as in FIG. 6b.

FIG. 10b shows a plan view of the arrangement from FIG. 10a.

DETAILED DESCRIPTION

Figure 2A:
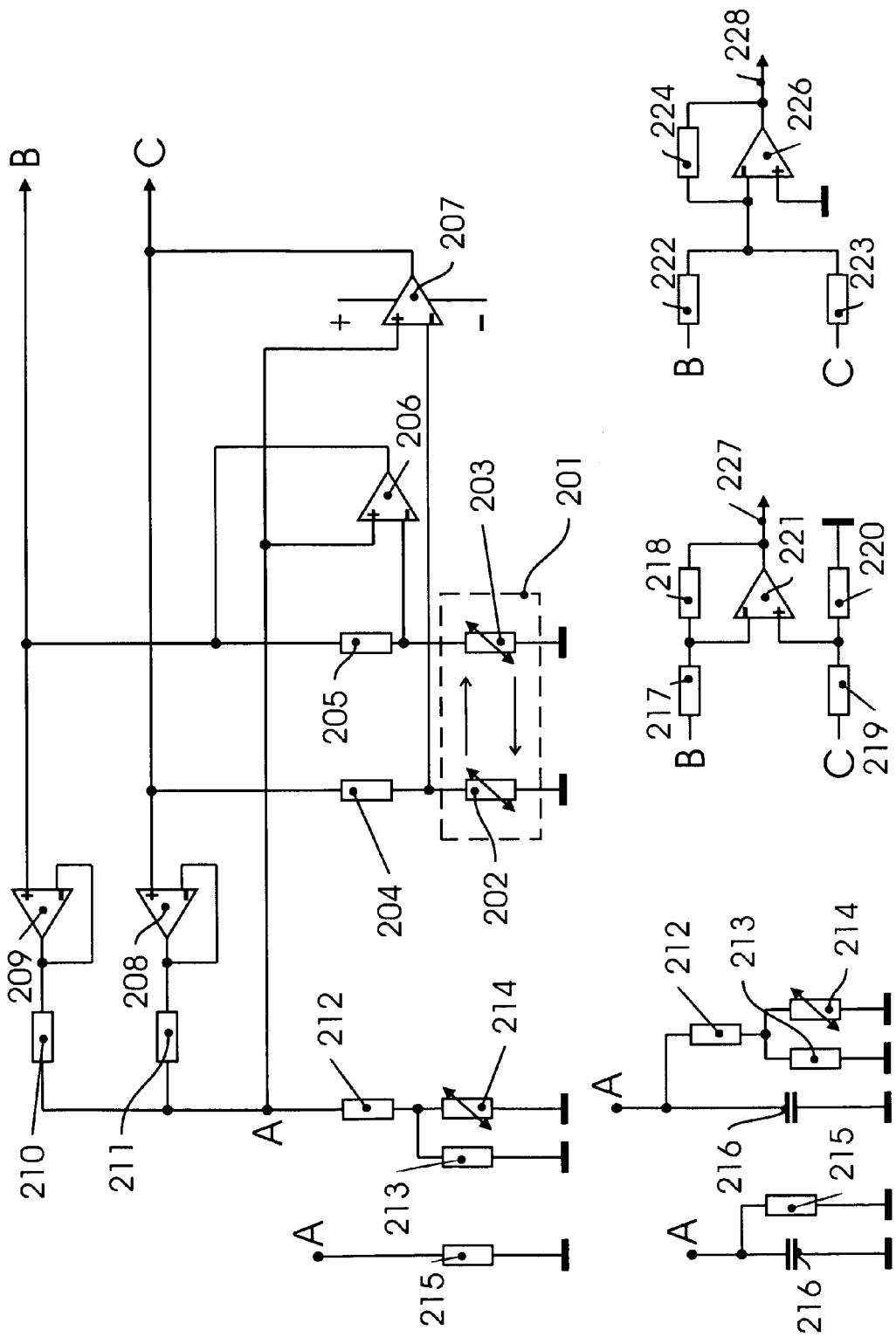
FIG. 2*a* shows a circuit diagram for operating the sensor shown in FIGS. 1*a* and 1*b*.

Exemplary embodiments of the invention are explained with reference to the drawings.

In the figures

FIG. 1a: shows a sensor according to the invention in section (A) comprising the sealed sensor housing 111 filled with fluid of suitable density and the parts fabricated by microsystems technology:

Supporting member 101, self-supporting sensor crosspieces (exciting and measuring elements: "sensor-elements") 102 and 103 with temperature-dependent electrical resistance, for example, made of doped silicon. When these are heated, isothermal fields are formed around the sensor crosspieces. When the two crosspieces are located in a horizontal plane and heated with the same power, their isotherms contact the same temperature value 107 and 108 in the symmetry plane 106.

The diagram in FIG. 1a shows indicated isotherms (107, 108) such as are formed in the Earth's gravitational field. In weightless space the isotherms have the form of circles with the element (assumed here to be a point for simplicity) as the central point. The next isotherms with a different temperature form common enclosing isotherms, e.g. 105. These common isotherms should lie within a circle 109 around the central point 110 between the crosspieces so as not to touch the supporting member and keep the influences of the different thermal conductivity and heat capacity of the supporting member and the surrounding capsule 111 as small as possible.

FIG. 1b shows the supporting member 101 from FIG. 1a fabricated by Microsystems technology in plan view. A lateral acceleration transverse to the elements in the direction of the plane in which the elements are located initially results in both elements dipping into isotherms each having a different temperature.

However, if the temperature of the elements is to remain the same, additional power must be supplied to both elements. The total of the operating power for both elements thus increases.

An inclination of the symmetry plane 106 from the perpendicular on the other hand has the result that the isothermal fields of the two elements are approximately only vertically displaced with respect to one another. In a certain angular range in the stationary state the change in the total power for both elements is small or negligible. The distribution of the power fractions in the total power is a measure for the angle of inclination with respect to the perpendicular. Thus, the signal can be separated between acceleration and inclination by forming the sum or the difference or the ratio of the powers supplied to each element.

FIG. 1c shows a sectional view of another structural variant of a sensor with thermopiles as temperature sensors (measuring elements) on two heated crosspieces (exciting elements).

An insulating layer 114 is first applied to the supporting member 101. Located thereabove is an electrical resistance layer, preferably not temperature-dependent, which forms the heaters 112 and 113 and the surfaces 123 and 124. Another thin insulating layer 114 is arranged thereabove.

The thermopiles 115/117 and 116/118 are applied above this insulating layer in the area of the freely etched crosspieces. The two other arms of the thermopiles 115/117 are connected to the two connection pads 121. The two outer arms of the thermopiles 116/118 are connected to the two connection pads 122.

The contact surfaces 123 and 124 have a continuous bonding to the contact pads 119 and 120. The current supply for the exciting elements is provided here.

FIG. 1d shows a plan view of the sensor from FIG. 1c.

FIG. 2a shows a circuit for temperature-regulated operation of the sensor from FIGS. 1a and 1b (initially using heating elements). Located in the fluid-filled capsule 201 are the temperature-dependent sensor elements 202 and 203.

After being switched on via the resistance 205 (204) the amplifier 206 (207) delivers increased current through the element 203 (202) until the same potential is present at the minus input of the amplifier as at the plus input (potential "A") as a result of the heating of the temperature-dependent element. At this operating point, the current is adjusted quickly and precisely as a result of the high amplification and high reaction speed of the selected amplifier so that the potential "A" is always present at the two amplifier inputs. Depending on the desired operating mode, the potential "A" is formed as follows:

a) Operation at Constant Absolute Temperature:

At point "A" the resistance 215 is grounded and a total current flows through it from the amplifiers 208 and 209 via the resistances 210 and 211. The amplifiers 208 and 209 image the potentials at the outputs of the amplifiers 207 and 206 free from feedback.

The resistances 210 and 211 are preferably dimensioned so that they have the same resistance and this corresponds to twice the value of 215. In this case, a potential "A" is formed, corresponding to half the average of the signal voltages from the amplifiers 206 (output "B") and 207 (output "C").

The resistances 204 and 205 are preferably the same and dimensioned so that they are equal to the resistance which the temperature-dependent elements 202 and 203 acquire at the desired absolute value of the constant temperature to be regulated.

The tracking of the potential "A" can be somewhat delayed as required using the capacitor 216 in order to minimize the effect of perturbing pulses, for example.

b) Operation at Constant Temperature Difference from Ambient Temperature:

A temperature-dependent resistance 214 is thermally connected to the supporting member or the housing of the arrangement and is matched by means of the resistances 213 and 212 in order to have the same temperature range as the sensor elements. Optionally another capacitor 216 can be switched in parallel.

If the ambient temperature now increases, for example, the potential "A" and thus the desired value for the temperature to be regulated are increased accordingly. The distance between the regulated temperature and the ambient temperature thus remains the same.

c) Temperature Modulation Operation

If a small periodically varying current is supplied at point "A", FIG. 2a, in one of the variants described above, whereby the "desired" potential "A" accordingly varies periodically, the regulated temperature level will also change periodically.

A supplied sine signal for example results in a sinusoidal "thermal wave" ("thermowave") if the average of the temperature fluctuations has a sufficiently large difference from the ambient temperature.

In this variant, therefore the advantages of the regulated temperature level can be combined with the advantages of the operating mode with "alternating component mode", as described in DE 103 48 245.8-52.

In FIG. 2a the outputs of the variable-gain amplifiers 206 and 207 are characterized by "B" and "C".

If a difference amplifier consisting of the amplifier 221 and the resistances 217, 218, 219, 220 is connected here, a signal for the power distribution in the common isothermal field, that is for example, for the inclination is available at the output 227.

If a summation amplifier consisting of the amplifier 226 and the resistances 222, 223 (preferably the same) and 224 is connected to the points "B" and "C", a sum signal is obtained at the output 228, which is a measure for the total power in the common isothermal field and thus for the acceleration of the arrangement.

If both output amplifiers are present, two separate signals, for example, for inclination and acceleration are available starting from a sensor arrangement.

The circuit can easily be extended, for example, to four sensor elements with the same desired value, wherein the resistances 210 and 211, as well as two further resistances have four times the value of 215. The principle of the circuit is equally suitable for designs with cooling elements.

Figure 2B:
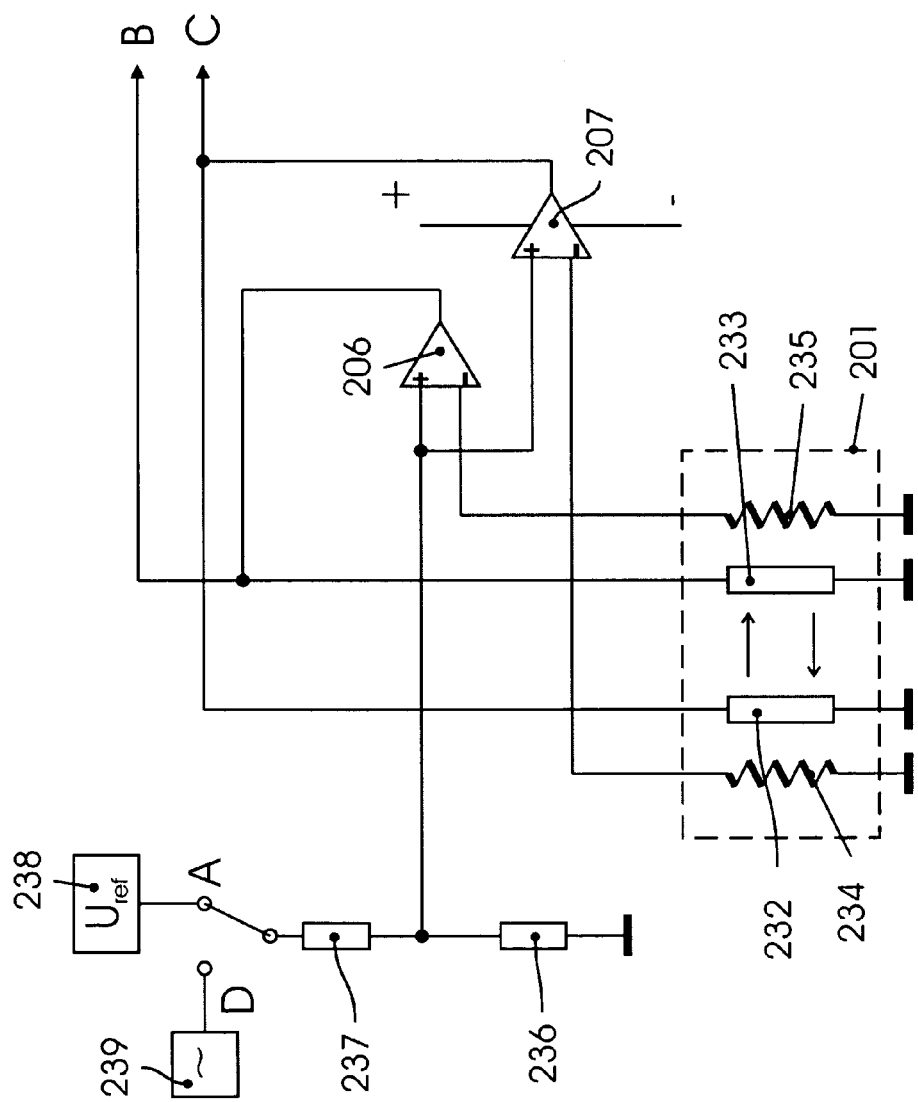
FIG. 2*b* shows a circuit diagram for operating the sensor shown in FIGS. 1*c* and 1*d*.

FIG. 2b shows a corresponding circuit for operation at a constant temperature difference from ambient temperature using separate excitation and measuring elements in good thermal contact, as shown in FIGS. 1c and 1d (version for heating elements).

The desired value for the variable-gain amplifiers 206 and 207 is deduced here (in switch position A) from a reference voltage 238 via the voltage divider resistances 237 and 236. The heating elements 232 and 233 are supplied with increased current until the voltage at the thermally best-coupled thermopiles 234 and 235 corresponds to the desired-value potential. Since the cold arms of the thermopiles lie at the temperature level of the supporting member and thus at ambient temperature, regulation takes place automatically at a constant temperature difference with a fixedly predefined desired-value voltage.

If a dc voltage with a modulated alternating component 239 (in switch position D) is used instead of a constant voltage, a superposed "thermal wave" can also be generated here.

In this circuit the evaluation is made via the outputs "B" and "C" as in the previous circuit 2a.

A "cascading" of a plurality of excitation and measuring elements can be accomplished more simply here by switching the plus inputs of the further amplifiers and also 206 and 207 in parallel.

Figure 3A:
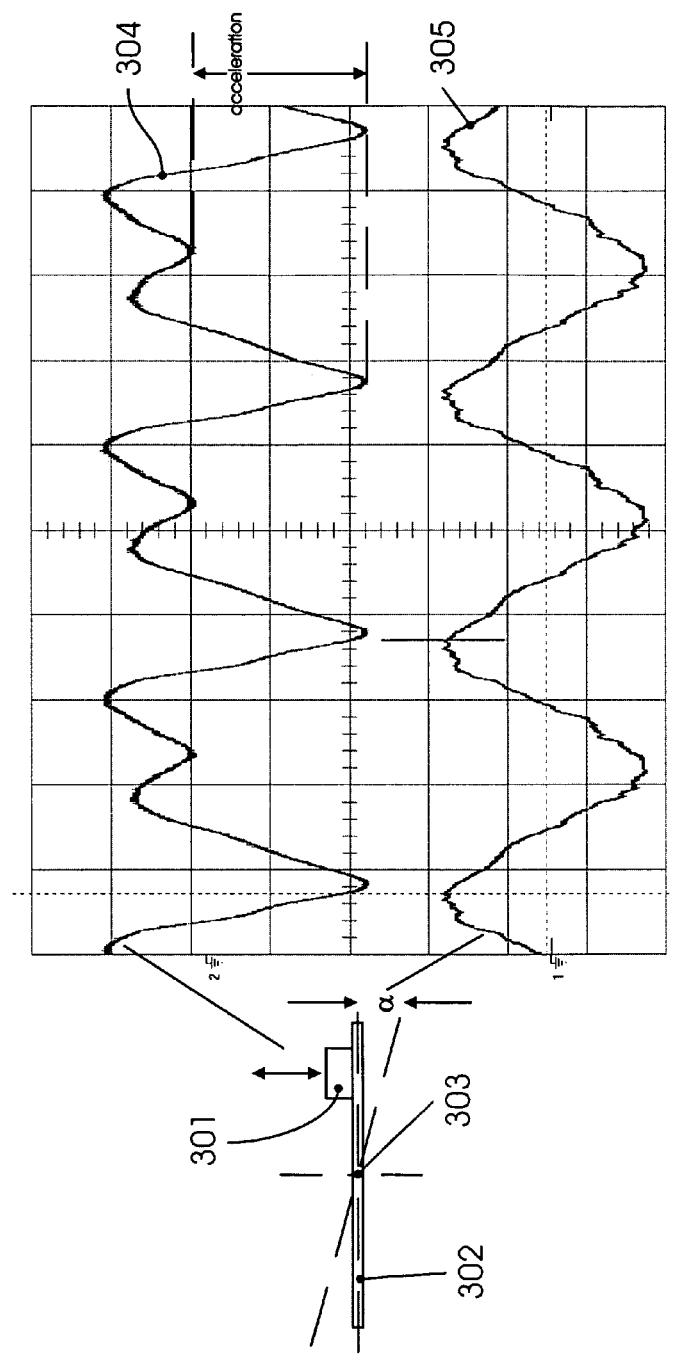
FIG. 3*a* illustrates an exemplary measurement utilizing a sensor according to the invention.

FIG. 3a shows results of measurements from an experimental structure where a sensor 301 is mounted at one end of a rocker 302. The sensor 301 largely corresponds to that in FIGS. 1a and 1b and the operating circuit for the sensor largely corresponds to that in FIG. 2a.

The rocker 302 is mounted at a pivot 303 and is cyclically deflected by the angle a by means of a motor. The signal profile 304 is obtained at the signal output for the acceleration (228) and the signal profile 305 for the inclination is obtained at the other signal output (227).

Figure 3B:
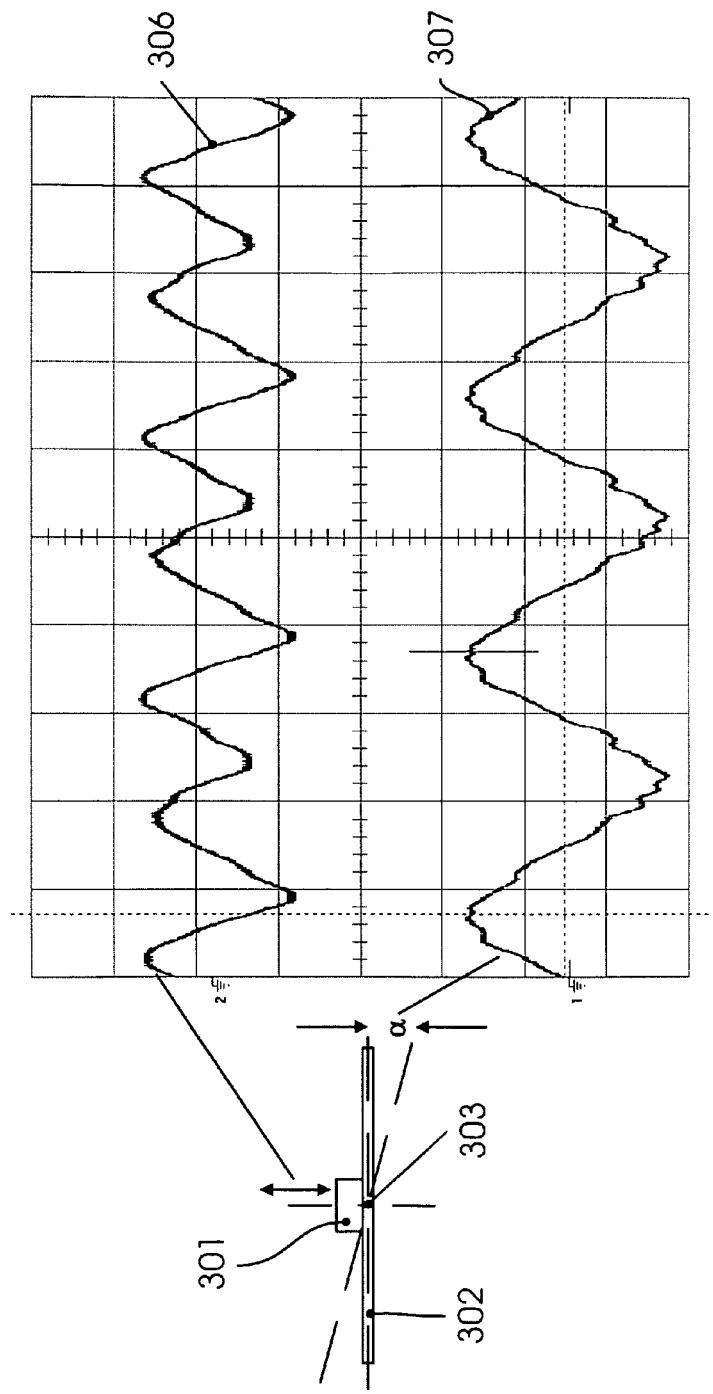
FIG. 3*b* illustrates the measurement as in FIG. 3*a* with an alternative sensor mounting.

FIG. 3b shows results of measurements from the experimental structure as FIG. 3a but the sensor 301 is mounted directly at the pivot 303 of the rocker 302. The rocker experiences the same deflection as previously. At the signal output for acceleration the signal profile 306 now shows a considerably smaller amplitude ("tilt acceleration") whereas the signal for the inclination 307 reveals no differences from 305.

FIG. 4a shows another advantageous embodiment of a sensor according to the invention, similar to FIG. 1 but with an additional sensor element 404 on the supporting member 401 at the center between the two sensor elements 402 and 403.

The element 404 is preferably regulated at a different (here shown higher) temperature than the elements 402 and 403. The outer common isotherm 405 differs in temperature only insignificantly from the ambient temperature and lies inside the circle 409. This circle around the centre of the middle element characterizes the range where no parts of supporting members or housing impair the free propagation of the isotherms.

During a lateral acceleration or movement transverse to the three elements both the total power and the power distribution vary. Whereas one of the lateral elements moves towards higher isotherms of the middle element, the respectively other element moves away from these higher isotherms. The direction of movement or acceleration can thereby be determined.

FIG. 4b shows a schematic plan view of the supporting member from FIG. 4a.

Figure 4C:
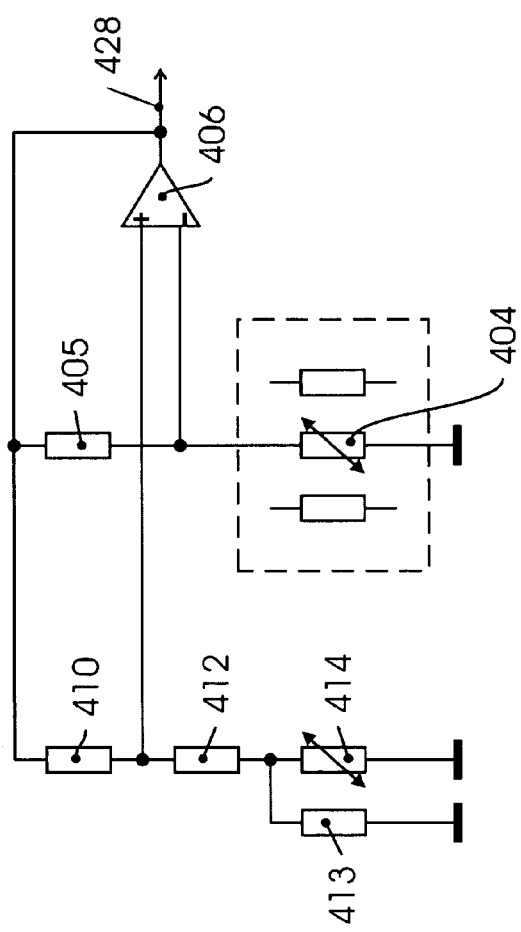
FIG. 4*c* is an exemplary circuit diagram used in combination with the sensor shown in FIG. 4*a* and FIG. 4*b*.

FIG. 4c shows a circuit with which the element 404 (from 4a and 4b) can be regulated at a certain (higher) temperature.

In this circuit regulation is carried out to a difference from ambient temperature which is detected using the temperature sensor 414. The resistances 413 and 412 are used to adapt to the temperature coefficients of 404.

The resistances 405 and 410 should be designed so that in the steady state at the desired temperature the two inputs of the amplifier 406 have the same potential.

A signal for forming the sum of the total power consumption can be tapped at the output 428.

FIG. 5 shows another sensor arrangement such as is already known in similar form from EP 1 111 395 B1, FIG. 7a and from DE 103 48 245.8-52, FIG. 4a.

In contrast to said arrangements, here twelve identical sensor elements are arranged with mirror symmetry and rotational symmetry in four groups of three around the central point of the chip and these elements are regulated according to the invention in a first variant to the same temperature.

In further variants the regulated temperatures can be different and/or can vary cyclically within a group of three or from one group to another in order to generate, for example, rotating "thermal waves" (as in DE 103 48 245.8-52).

FIG. 5a shows a section through the center of the sensor arrangement comprising the supporting member 501 and the groups of three sensor elements 532, 534, 533 and 513, 514, 512.

FIG. 5b shows a plan view of the sensor arrangement on the supporting member 501 comprising the four groups of three sensor elements 502, 504, 503 and 512, 514, 513 and 522, 524, 523 and 532, 534, 533. These groups are arranged in a polygon shape equidistant from the central point 550. Reference resistances 541 (with indicated connection pads 542 and 543), 544, 545, 546 are provided to detect the temperature of the supporting member 501 in thermally good conduction with said member.

A sensor arrangement according to FIG. 5 is fundamentally suitable both for detecting the inclination of both axes and also for detecting lateral acceleration and vertical acceleration, as well as rotational acceleration and rate of rotation during rotation about the central point 550.

If the sensor elements of this arrangement according to the invention are heated, for example, and regulated at constant temperature, the power distribution in the individual groups varies according to the previously described rules in the event of an inclination.

If, for example, the element 532 is inclined downward and thus the element 512 is accordingly inclined upward, the power fraction of the elements 532 and 513 becomes higher and the power fraction of the elements 533 and 512 becomes lower than the fraction in the horizontal position. If the signals from the respectively opposite groups are combined and the average is formed, signals are obtained for both directions of inclination which are free from effects of the different thermal coupling to the supporting member.

If the arrangement is exposed to a lateral, vertical or rotational acceleration, the total power requirement increases. Indications for the direction of the acting acceleration can be deduced from the distribution of the power fractions for the four groups of three.

However, if the arrangement is set in motion about 550, the power fraction of all four elements (503, 513, 523, 533) nearest to the central point is reduced whilst a larger power fraction must be supplied to the outer elements (502, 512, 522, 532). This is essentially caused by the following effects:

The elements on the outer orbit or the outer polygonal course are further apart from one another than on an inner path. Accordingly, they move through more extensive fluid zones at a lower temperature level.

As a result of pressure gradients and the centrifugal force, the denser colder zones are displaced outward and in addition correspondingly radially displaced as a result of the Coriolis effect.

Depending on the applied rate of rotation, a geostrophic front can be formed through the action of the Coriolis effect.

As was stated in the introduction to FIG. 5, according to the invention the four groups of three can be regulated at different temperatures. During rotation a signal profile is then obtained from which the direction of rotation can be derived.

For example, if the groups 502, 504, 503 and 522, 524, 523 are regulated at an average temperature, the group 532, 534, 533 is regulated at a higher temperature and the group 512, 514, 513 is regulated at a lower temperature, in the event of clockwise rotation the group 502, 504, 503 will show a higher power requirement and in the event of counterclockwise rotation, a lower power requirement than the opposing group 522, 524, 523.

When operating with a microprocessor, the previously described operating modes can also be achieved alternately with the same or different regulating desired values.

In this way, a self-test of the arrangement can be conducted.

In a further "rotating thermal wave" operating variant, the arrangement can be operated as follows to detect the rate of rotation:

The elements 513 and 533 located on the inner circle or polygonal course are initially regulated to an average temperature, the element 503 to a higher temperature and the element 523 to a lower temperature. At rest the elements 513 and 533 require the same power. If the arrangement is now rotated about the central point 550, the power distribution for the elements 513 and 533 changes.

If a threshold value for the power variation is specified, for example, for the element 513 and if the desired value for regulating the element 513 after exceeding this threshold value is set, for example, at a higher temperature and at the same time, the desired value for the opposing element 533 is set at a lower temperature and the desired values for the elements 503 and 523 are set at an average temperature, a rotating thermal wave is obtained whose frequency is a measure for the rotation.

The direction of rotation can be deduced from the desired value sequence.

The elements on the outer circles or polygonal courses (502, 504 etc.) can be regulated at the same average temperature and indicate the inclination of the arrangement via the power distribution.

If this inclination display function is dispensed with and the elements on the middle circle or polygonal course 504, 514, 524, 534 are replaced by a continuous thermal separating wall, a dextropropagating thermal wave can be generated, for example, on the inner circle or polygonal course 503, 513, 523, 533 and a sinistropropagating thermal wave can be generated on the outer circle or polygonal course 502, 532, 422, 512. As in the Sagnac principle in optical gyroscopes, the difference between the periods is a measure for the rate of rotation.

FIG. 6a shows a sensor arrangement according to the invention comprising sensor elements on two levels. This makes it possible to achieve improved spatial resolution and accuracy for measurement of position and movement. In addition, this arrangement has the best conditions for self-calibration to zero position and acceleration due to gravity.

Such an arrangement can be fabricated, for example, by bonding two SOI wafers one on top of the other using microsystems technology. In a sealed housing 609 a supporting member 601 is fixedly joined (e.g. by anodic bonding) to the further supporting member 604.

The sensor elements 602 and 603 are a component of the supporting member 601 and the elements 605 and 606 are a component of the supporting member 604. The supporting member 604 (e.g. SOI wafer) is designed to a suitable thickness to have the same distance from element 605 to element 602 and to element 606. In cross-section the four elements lie at the corners of an imaginary square.

When the individual elements are regulated, for example, to the same constant temperature, where all four elements act in equal parts on point A in the circuit shown in FIG. 2a, isotherms 607 are formed in the gravitational field. The natural calibratable zero position of the arrangement (right angles to the perpendicular) is given if the power distribution between the element groups 602, 605 and 603, 606 is 50% each.

In the horizontal given arrangement the power distribution between the element groups 602, 603 and 605, 606 is a measure for the acceleration due to gravity.

The principle of this sensor accordingly allows self-testing and recalibration with reference to the zero position and the acceleration due to gravity without external reference in all four quadrants when inclined by 360 angular degrees.

Complete resolution and best accuracy over the entire 360 angular degrees are further advantageous properties of the arrangement.

More appropriately, the outermost still-relevant isotherms should lie inside a circle 608 whose central point coincides with the center of the imaginary element square.

FIG. 6b shows an arrangement according to the invention comprising elements in two planes as in FIG. 6a but in this case as an example, four groups each containing four spatially distributed elements are arranged in a circular or polygonal shape around the central point of the chip.

The number of groups of elements can also be higher or lower and depends on the envisaged field of application.

As in FIG. 6a, an individual element group consists of four elements 602, 603, 605, 606 arranged spatially according to an imaginary square. The supporting members 601 and 604 isolated from two bonded wafers are located in the sealed fluid-filled housing 609. Again attention should be paid to sufficient spacing according to the circle 608.

If the individual element groups are operated with different desired values, as described under FIG. 5, in addition to inclination, acceleration and rate of rotation, the direction of rotation can also be derived from the signals.

A sensor according to the invention can thus identify position in the gravitational field and movement in all degrees of freedom according to extent and direction and thus exhibits the features of an inertial sensor. In addition, the arrangement offers the best condition for self-testing and calibration to the natural zero position and the acceleration due to gravity.

In order to further enhance resolution and accuracy, rotating thermal waves can also be superimposed here and evaluated using the method described under FIG. 5 (change in frequency or variation in the period difference using the Sagnac effect).

FIG. 7a shows a sensor structure according to the invention using heating and cooling elements. The fluid-filled housing 709 contains the supporting member 701 with the heating element 703 and the cooling elements 702 and 704. Peltier elements fabricated by Microsystems technology can be used as cooler and as heaters, for example, depending on the direction of flow.

As shown in FIGS. 1c and 1d, the cascaded Peltier elements can be applied to crosspieces (accordingly 112, 113) via a thermally good-conducting, electrically insulating layer. In this case, however, these crosspieces have a temperature-dependent resistance in order to serve as temperature sensors.

If, for example, the desired values for the regulation of the cooling elements are set to a certain negative temperature difference from ambient temperature and the desired value for the regulation of the heating element is set to a positive temperature difference by the same amount, a temperature profile as indicated schematically in the drawing will be established in the horizontal rest position. Under the conditions described the isotherms 707, 706, 708 lie at the level of the ambient temperature.

Advantages of the arrangement are a large signal stroke and good symmetry.

When the respective direction of flow is reversed, a cold-warm wave motion can be generated cyclically for example and methods such as time measurement or alternating component (as described previously) can be used in the signal evaluation.

FIG. 7b shows a plan view of an arrangement such as can be fabricated, for example, to fulfill the function described under FIG. 7a.

The measuring elements 702, 703, 704 are first arranged in a self-supporting fashion over a freely etched cavity of the supporting member 701 and joined to the supporting member with connection pads. A thin, good heat-conducting, electrical insulating layer is applied to these measuring elements.

Located in turn thereon are the "active support points" of the Peltier elements for cooling or heating all the sensor elements. The Peltier elements likewise have connection pads.

In the arrangement shown one row of Peltier elements each is provided from the supporting member to the measuring element 702 and the measuring element 704 in order to cool these. One row of Peltier elements each, insulated therefrom, is provided from the measuring element 703 in the direction of element 702 and element 704 (alternatively directly to the supporting member) to heat the element 703.

FIG. 8 shows a sensor arrangement according to the invention comprising heating and cooling elements in two planes. The fluid-filled housing 809 contains the connected supporting members 801 with the cooling elements 802, 803 and 804 with the heating elements 805, 806. This arrangement is advantageous, for example, for measurements of inclination around 360 angular degrees and for measurements of vertical acceleration.

Figure 9:
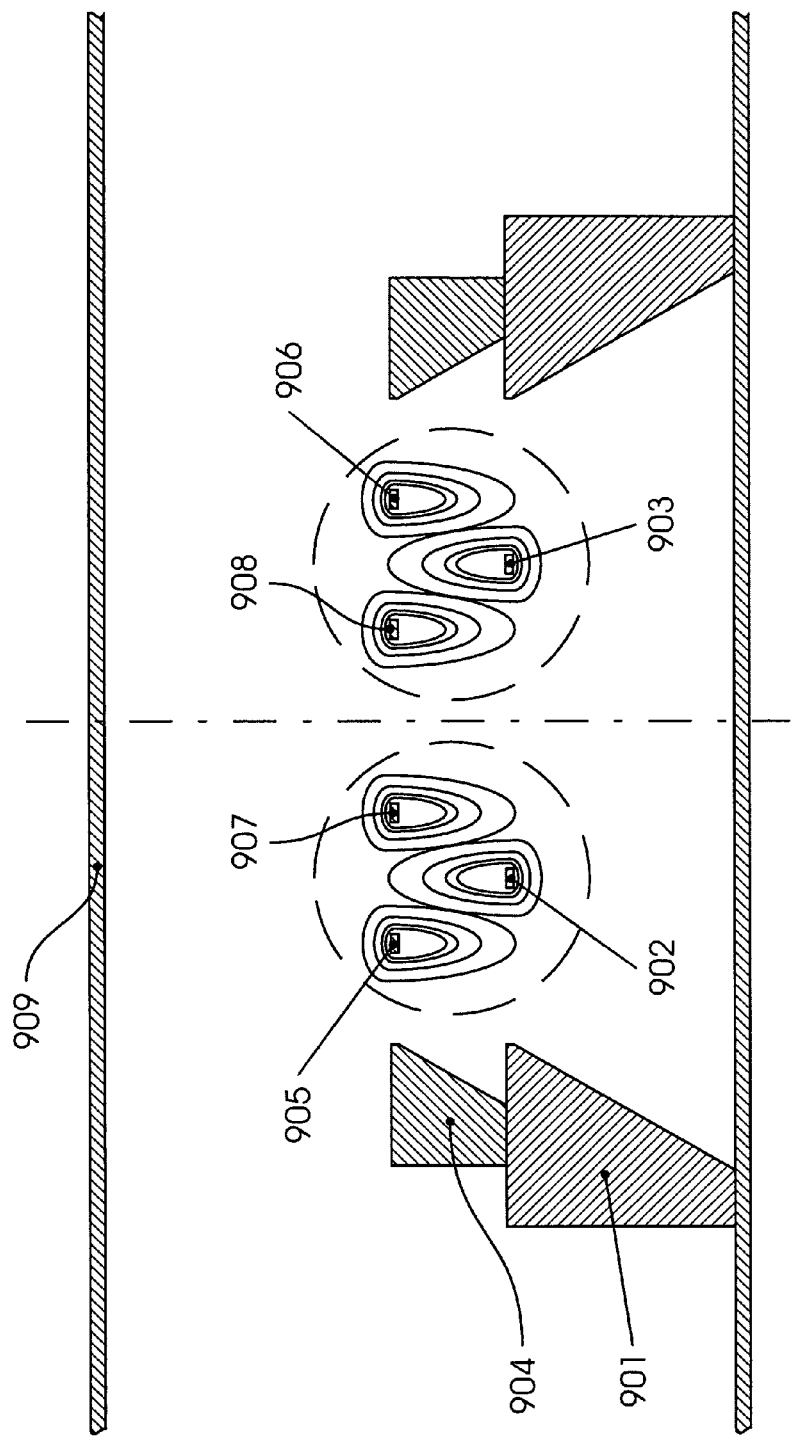
FIG. 9 shows a further variant of a sensor arrangement according to the invention with heating and cooling elements in two planes.

FIG. 9 shows a further variant of a sensor arrangement according to the invention with heating and cooling elements in two planes. The fluid-filled housing 909 contains the connected supporting members 901 with the heating elements 902, 903 and 904 with the cooling elements 905, 907, 908, 906.

Further groups of sensors such as 902, 905, 907 and 903, 908, 906 can be arranged in a circular or polygonal shape around the central axis.

This sensor arrangement is advantageous for example for detecting rotational acceleration and rate of rotation as a result of the large signal stroke and extremely good symmetry.

FIG. 10a shows a sensor arrangement according to the invention with elements in two planes as in FIG. 6b.

Unlike FIG. 6b where different desired values are provided circumferentially for the radially distributed element groups, in this arrangement different desired values are taken for one element group near the center and for another at a greater distance from the center.

Alternatively, one element group can consist of heated elements and the other of cooled elements.

The fluid-filled housing 1009 contains connected supporting members 1001 and 1004.

The sensor elements 1002 and 1005 are part of an outer circumferential element group, all regulated or cooled to low temperature for example.

The sensor elements 1003 and 1006 stand for an inner circumferential element group, regulated to a higher temperature, for example.

In the horizontal rest position under the conditions described, the fluid is circulated in the direction of the sequence of arrows shown on the right of the drawing and a constant power distribution is established between the outer and the inner group.

If the arrangement is set in rotation about the indicated central axis, centrifugal force, the Coriolis effect and, depending on the rate of rotation, a geostrophic front, have an effect, causing the power distribution between the outer and the inner group to vary.

A self-supporting separating ring between the outer group 1002, 1005 . . . and the inner group 1003, 1006 . . . can alternatively intensify the "chimney effect". It is designed at a suitable height to leave sufficient space for the flow between the ring and the housing bottom or housing cover.

FIG. 10b shows a plan view of the arrangement from FIG. 10a comprising the supporting members 1001 and 1004, the outer elements 1005 . . . , the inner elements 1006 . . . , and an indicated geostrophic front 1008 and the alternatively arranged self-supporting separating ring 1007.

Figure 10C:
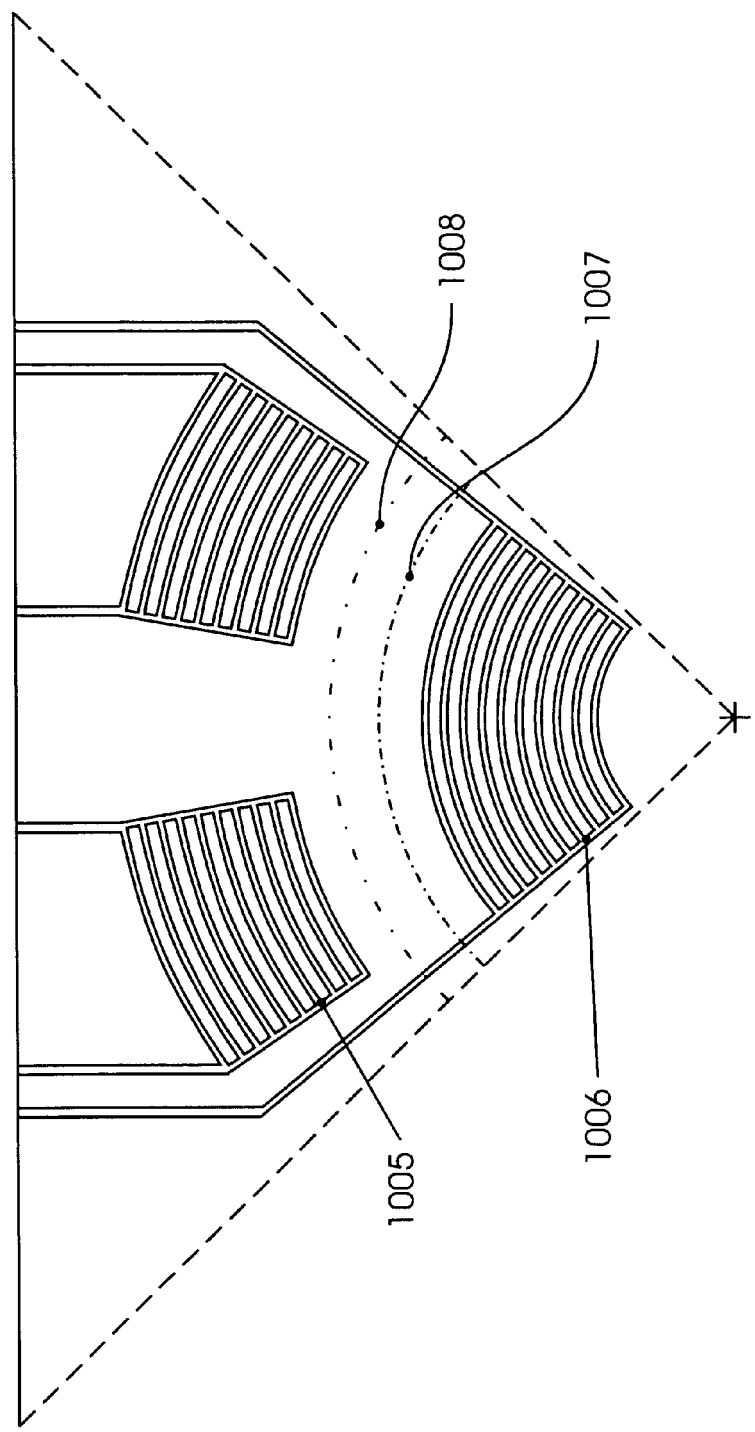
FIG. 10c shows a segment of the sensor arrangement.

FIG. 10c shows a segment of the sensor arrangement according to the invention where the arrangement consists of a plurality of such segments.

If, as is shown here, these are 90° segments, four of these belong to a quadratic sensor arrangement.

The embodiment of resistance sensor elements shown can be used for sensor arrangements having one element plane, as shown in FIG. 5 for example, and also for sensor arrangements with two element planes as in FIG. 6, FIG. 8, FIG. 9 and FIG. 10a.

The comb-like sensor elements 1005, 1006 . . . are combined from individual crosspieces to obtain the largest possible surface for heat exchange. If the crosspieces consist of polysilicon, for example and have a high electrical resistance, it is appropriate to use the parallel circuit of the crosspieces which is shown, to achieve a suitable lower target resistance. However, if the crosspieces are fitted with low-resistance metal resistances, a meander-shaped series circuit is to be preferred.

The embodiment shown in FIG. 10c can be transferred directly to FIG. 10b (1008=possible geostrophic front; 1007=alternative separating ring).

An advantageous application of this embodiment according to the invention, combined with the "time measurement" method of evaluation is described in the following example:

All elements are initially regulated at low temperature (small difference from ambient temperature). Beginning with the element 1005 and the diametrically opposite element, their desired temperature is raised in a ramp fashion or sinusoidally. In the rest position the thermal energy thus produced propagates in all directions and also influences the adjacent elements in the clockwise and counterclockwise directions.

In the horizontal rest position these adjacent regulated elements reduce their own operating power at the same time and in the same extent. If a threshold value is set for this reduction at the two adjacent elements, this threshold is reached at the same time in this case.

Falling below the threshold value causes a reversal of direction of the desired value default for element 1005 and that located opposite thereto, whereby these cool. As a result, the adjacent elements again require more power. At another threshold value for the power increase, another reversal of the direction of the desired value default takes place. In the horizontal rest position, a fundamental frequency of this oscillation is established. When the arrangement rotates, one of the adjacent elements will respond earlier than the other. The time difference or the difference between the relevant frequency and the fundamental frequency is a measure for the rate of rotation.

What is claimed is:

1. A sensor for detecting at least one of position, inclination to perpendicular, movement and acceleration, the sensor comprising a closed container which encloses a fluid and at least two excitation-measuring sensor elements whose characteristic temperature can be varied by current flow and which at the same time provide a signal for their characteristic temperature, characterized in that the sensor elements have a temperature which is different from the container temperature, wherein each of the sensor elements is surrounded by its own isothermal field, and that the sensor elements are arranged spatially so that the isothermal field of one of the sensor elements affects the isothermal field of the other sensor element(s).

2. The sensor according to claim 1, characterized in that the at least two sensor elements have common isotherms in an edge zone at a wall of the container, which can be inscribed substantially in circles around the spatial central point of the arrangement of sensor elements.

3. The sensor according to claim 1, wherein
each of the at least two sensor elements is regulated electronically to a predetermined temperature,
a measure for an electrical power supply to maintain the predetermined temperature for each individual sensor element can be tapped, and at least one of
position, tilt, lateral acceleration, vertical acceleration, movement of the container, rotation and rotational acceleration around any axis are calculated as a function of said tapped measure.

4. A method for operating sensors according to claim 3, characterized in that the sensor elements are held at a constant absolute temperature, or at a difference temperature with respect to the temperature of the container, or at a difference temperature with respect to other sensor elements, by readjusting the power supply through a fast electronic control loop.

5. The method according to claim 4, characterized in that all the sensor elements have the same desired value for the control temperature or that all the sensor elements in a container have different desired values for the control temperature so that the direction of acceleration or rotation can be derived from a signal profile of the calculated acceleration over time.

6. The sensor according to claim 1, characterized in that the sensor elements are arranged spatially distributed on two or more planes, comprising at least a lower plane and an upper plane,
wherein two or four sensor elements lie on the lower plane and two or four sensor elements lie on the upper plane, and the distance between the sensor elements in one plane corresponds to the distance between the planes, so that the central points of the crass-sections through the sensor elements lie at the corners of a square, whereby an inclination can be measured in one axis over 360 angular degrees.

7. The sensor according to claim 1, characterized in that the sensor elements are arranged in one or two plane(s) around a central axis along a circle or along a polygonal course which has four or more than four elements.

8. The sensor according to claim 1, characterized in that it is fabricated using one or more substrates in microsystems technology and that the sensor elements are arranged self-supporting over an opening or a plurality of openings of the substrate or the substrates.

9. The sensor according to claim 1, characterized in that each sensor element has two connections for supplying electrical power and two separate connections for tapping a voltage.

10. The sensor according to claim 1, characterized in that the sensor elements are selected from the group consisting of:
a) sensor elements comprising a material which can change its characteristic temperature as a result of current flow, and also provide a measure for its characteristic temperature in the form of the intrinsic electrical resistance, which has a reproducible temperature dependence, and
b) sensor elements comprising a plurality of materials, wherein one material is provided or a plurality of materials are provided to change the temperature of the entire sensor element as a result of current flow, a further material or further materials are provided to supply a signal for the characteristic temperature of the sensor element and a further material or further materials are used for electrical insulation.

11. A method for manufacturing sensors according to claim 1, comprising the steps of:
a) providing a first wafer having a standard thickness, the first wafer being structured as a support for a lower level of sensor elements;
b) providing a second wafer having a thickness approximately corresponding to the spacing of the sensor elements on the first wafer, the second wafer being structured as a support for an upper level of sensor elements;
c) aligning the first and the second wafer to one another and joining them together by anodic bonding.

12. A method for operating the sensor according to claim 1, said sensor comprising a first, a second, and a third sensor element, characterized in that a change in the desired value of the control temperature for the first sensor element is caused by a signal change of the second sensor element, the second sensor element being located adjacent to the first sensor element, preferably after exceeding a predetermined threshold value of the signal change.

13. The method for operating sensors according to claim 1, characterized in that individual sensor elements are briefly regulated at a higher or lower desired value or successively to different desired values and the signal change of the neighboring elements is evaluated for self-testing purposes.

14. The method for operating sensors according to claim 1, characterized in that the transit time of a change in desired value from a first sensor element up to a certain threshold of the signal change at a second neighboring sensor element is used as a measure for the filling state of the container.

15. A sensor comprising:
 a fluid filled container;
 two electrically conductive sensor elements substantially parallel to each other located within the fluid filled container, the sensor elements being thermally coupled to each other through the fluid;
 an electronic control circuit operatively connected to the sensor elements, the electronic control circuit configured to maintain each sensor element's temperature at a substantially constant predetermined value by adjusting the electric power applied to the sensor element;
 wherein at least one of sensors position, motion, rotation, inclination, and acceleration is determined as a function of the electric power applied to the sensor elements.

16. The sensor as in claim 15, wherein the sensor elements comprise a temperature measuring element and a temperature control element.

17. The sensor as in claim 16, wherein the temperature measuring element and the temperature control element are combined in a temperature dependent electrical resistance.

18. The sensor as in claim 17, wherein the sensor elements are made of silicon.

19. The sensor as in claim 15, further comprising a third and fourth sensor element arranged substantially at a right angle relative to the two sensor elements.

20. The sensor as in claim 15, further comprising a third sensor element centrally located between the two sensor elements.

* * * * *